(12) United States Patent
Hodges

(10) Patent No.: US 9,150,368 B2
(45) Date of Patent: Oct. 6, 2015

(54) SELF RELEASING HOLDDOWN FOR MECHANICAL DOCK LEVELERS

(76) Inventor: Jamison H. Hodges, Baltimore, MD (US)

(*) Notice: Subject to any disclaimer, the term of this patent is extended or adjusted under 35 U.S.C. 154(b) by 1103 days.

(21) Appl. No.: 13/006,208

(22) Filed: Jan. 13, 2011

(65) Prior Publication Data

US 2011/0198868 A1  Aug. 18, 2011

Related U.S. Application Data

(60) Provisional application No. 61/336,135, filed on Jan. 15, 2010.

(51) Int. Cl.
 *E05D 1/00* (2006.01)
 *B65G 69/28* (2006.01)
 *F16G 11/10* (2006.01)

(52) U.S. Cl.
 CPC .................................. *B65G 69/2835* (2013.01)

(58) Field of Classification Search
 USPC ........ 14/71.3; 294/86.42; 24/115 N; 248/351, 248/680, 500, 622, 624; 29/559; 254/93 R, 254/93 L, 89 H; 267/73, 74, 148, 273, 291; 188/65.4, 65.5; 292/195, 225, 235, 292/DIG. 61, 262, 275, 277; 16/66
 See application file for complete search history.

(56) References Cited

U.S. PATENT DOCUMENTS

| | | | |
|---|---|---|---|
| 2,434,358 A * | 1/1948 | Frank | 439/788 |
| 2,681,781 A * | 6/1954 | Kellems | 248/60 |
| 3,117,332 A | 1/1964 | Kelley | |
| 3,137,017 A | 6/1964 | Pfleger et al. | |
| 3,186,048 A * | 6/1965 | Tann | 24/31 C |
| 3,316,575 A | 5/1967 | Larsen et al. | |
| 3,343,231 A * | 9/1967 | Clay | 24/136 R |
| 3,579,696 A | 5/1971 | Hecker | |
| 3,699,601 A | 10/1972 | Hecker et al. | 14/71 |
| 3,893,650 A * | 7/1975 | Turben | 254/93 R |
| 3,927,926 A * | 12/1975 | Powell | 439/268 |
| 3,967,337 A | 7/1976 | Artzberger | 14/71.1 |
| 4,055,875 A * | 11/1977 | Strickland | 24/115 R |
| 4,126,909 A | 11/1978 | Smith et al. | 14/71.3 |
| 4,703,534 A | 11/1987 | Pedeersen | 14/71.1 |
| 5,303,443 A | 4/1994 | Alexander | 14/71.1 |
| 5,655,269 A * | 8/1997 | Sagalovich | 24/115 R |
| 6,012,742 A * | 1/2000 | Kocian et al. | 285/94 |
| 6,061,859 A | 5/2000 | Winter | 14/71.3 |
| 6,566,269 B1 * | 5/2003 | Biles et al. | 438/706 |
| 6,892,411 B1 | 5/2005 | Yoon et al. | 14/71.3 |

* cited by examiner

*Primary Examiner* — Alyson M Merlino
(74) *Attorney, Agent, or Firm* — Ober, Kaler, Grimes & Shriver; Royal W. Craig

(57) ABSTRACT

An improved holddown mechanism includes: (a) an elongated member having a pivoting end, a distal end and a nominal diameter and length, (b) an attachment arm having a pivoting end and a distal end, and (c) a tubular, adjustable diameter, wire mesh or Kellems grip having an attachment arm end and a release end wherein its adjustable diameter expands when this grip is put into compression and contracts when it is put into tension, and wherein the elongated member and the grip are configured such that the elongated member's diameter is such that it can fit within the tubular grip when its adjustable diameter is in an expanded state, and wherein the grip is further configured to engage the elongated member when a prescribed tensile force is applied to the tubular grip.

20 Claims, 4 Drawing Sheets

SELF RELEASING HOLDDOWN FOR MECHANICAL DOCK LEVELERS

CROSS-REFERENCE TO RELATED APPLICATION

This application claims the benefit of Provisional Patent Application No. 61/336,135, filed Jan. 15, 2010 by Jamison H. Hodges. The teachings of this application are incorporated herein by reference to the extent that they do not conflict with the teaching herein.

BACKGROUND OF THE INVENTION

1. Field of the Invention

The present invention relates generally to dock levelers. More particularly, the present invention relates to an improved holddown mechanism or holddown for use with mechanical dock levelers.

2. Description of the Related Art

Dock levelers are widely used in conjunction with freight vehicle loading docks and the like to provide a continuous path between a loading dock and the load bed of a vehicle. One widely used type of dock leveler comprises a generally planar ramp or deck member which is pivotally connected to a frame disposed in a pit or recess in a loading dock and moveable between a stored position substantially coplanar with the surface of the loading dock and an elevated position preparatory to engagement with the load bed of a vehicle when it is situated in proximity to the loading dock. So-called mechanical dock levelers typically utilize one or more heavy duty springs or other means which operate to bias the dock leveler's ramp from its stored position to an elevated position, including the engaged or working position of the dock leveler's ramp with respect to the vehicle load bed.

Dock levelers having upwardly biased ramps typically also include a holddown mechanism or one-way locking device that, when it is engaged, prevents the upward movement of the ramp while allowing its downward movement. Releasing this device allows the free end of the dock leveler's ramp to pivot upward about the ramp's hinge point.

Such holddown mechanisms typically includes a first member that is pivotally interconnected with the frame of the dock leveler and a second member that is extendible and retractable relative to the first member and pivotally interconnected with the dock leveler's ramp. A releasable engagement arrangement, such as a linear ratchet and pawl, is interposed between these members for selectively fixing their relative positions and thereby one-way locking the position of the ramp relative to the frame of the dock leveler and therefore the loading dock. See U.S. Pat. Nos. 6,061,859, 3,967,337, 3,699, 601, 3,579,696, 3,137,017, and 3,117,332.

All "linear ratchet and pawl" type holddowns have similar construction in which a ratchet bar telescopes inside a housing. The end of the ratchet bar is attached to either the bottom of the dock leveler's ramp or its base frame. Enclosed within the housing is a pawl that engages the ratchet and effectively prevents the upward movement of the pivoting ramp's free end. The ratchet is released via linkages and a manually tensioned chain. Connected to the housing is a compression spring that enables the holddown to allow for some limited upward movement of a pivoting ramp's free end to accommodate for those situations such as when the shock-absorbing springs on a being-unloaded vehicle cause its load bed to push up on the bottom of a dock leveler's ramp whose holddown is engaged or not released.

"Circular ratchet and pawl" type holddowns have also been utilized. See those described in U.S. Pat. Nos. 4,703,534 and 4,126,909, which use, respectively, either an extension or torsion spring to enable such holddowns to allow for limited upward ramp movements to accommodate limited upward movements of a vehicle load bed. See also the "circular drum" setup in U.S. Pat. No. 3,316,575 which uses a friction joint in place of a "ratchet and pawl" and an extension spring to enable this holddown to allow for some limited upward ramp movements. Linear friction brake holddowns have also been developed, see U.S. Pat. No. 5,303,443.

All of these prior art holddowns can have operational problems and/or be costly to manufacture. For example, those which utilize some type of spring to allow the holddown to "give" so as to accommodate limited upward movements of a vehicle load bed can encounter operational problems when their dock levelers are used by air cushioned trucks which can have significant load bed movements—such upwards movements can bottom out the holddown's spring (in the compression spring case) or over-extend its spring (in the extension spring case) and jam the holddown or damage its parts. To help avoid these problems, it would be advantageous if holddowns had the capability to be self-releasing in these situations.

Meanwhile, the "ratchet and pawl" engagement arrangements of these holddowns can be costly to manufacture. The ratchet, in particular, is a highly machined and therefore expensive part. The ratchet and pawl are also subject to wear (e.g., the teeth on the ratchet bar wear down during normal use and can necessitate replacement of the bar), require adequate lubrication, and are easily damaged if the spring (in the more common compression spring setup) bottoms out. Wear and damage to holddowns are often a limiting consideration is establishing the length of warranty that is provided on a mechanical dock leveler.

Thus, there is the need for the development of an improved holddown, for mechanical dock levelers, which will both last longer, as a result of having fewer operational problems, and cost less to manufacture, while also having a self-releasing capability in situations where significant load bed movements or elevation changes are encountered.

SUMMARY OF THE INVENTION

Recognizing the need for the development of improved holddowns for dock levelers of the type having a biasing mechanism that tends to move the free end of the leveler's hinged ramp upward, the present invention is generally directed to satisfying the needs set forth above and overcoming the problems and disadvantages exhibited by prior holddowns.

In accordance with a preferred embodiment of the present invention, an improved holddown includes: (a) an elongated member having a pivoting end, a distal end and a nominal diameter and length, (b) an attachment arm having a pivoting end and a distal end, and (c) a tubular, contractable, wire mesh grip having an attachment arm end, a release end and an adjustable diameter which expand when this grip is put into compression and contracts when it is put into tension, and wherein the elongated member and the grip are configured such that the elongated member's diameter is such that it can fit within the tubular grip when its diameter is in an expanded state, and wherein the grip is further configured to engage the elongated member when a prescribed tensile force is applied to the tubular grip.

The holddown of the present invention may also include: (d) a disengagement means configured to attach to the attachment arm and apply a compressive force to the grip' release end so as to cause the disengagement of the grip from the elongated member, and (e) a self-releasing means configured to cause the disengagement means to release the engagement of the grip to the elongated member when a specified strength tensile force is imposed on the grip.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
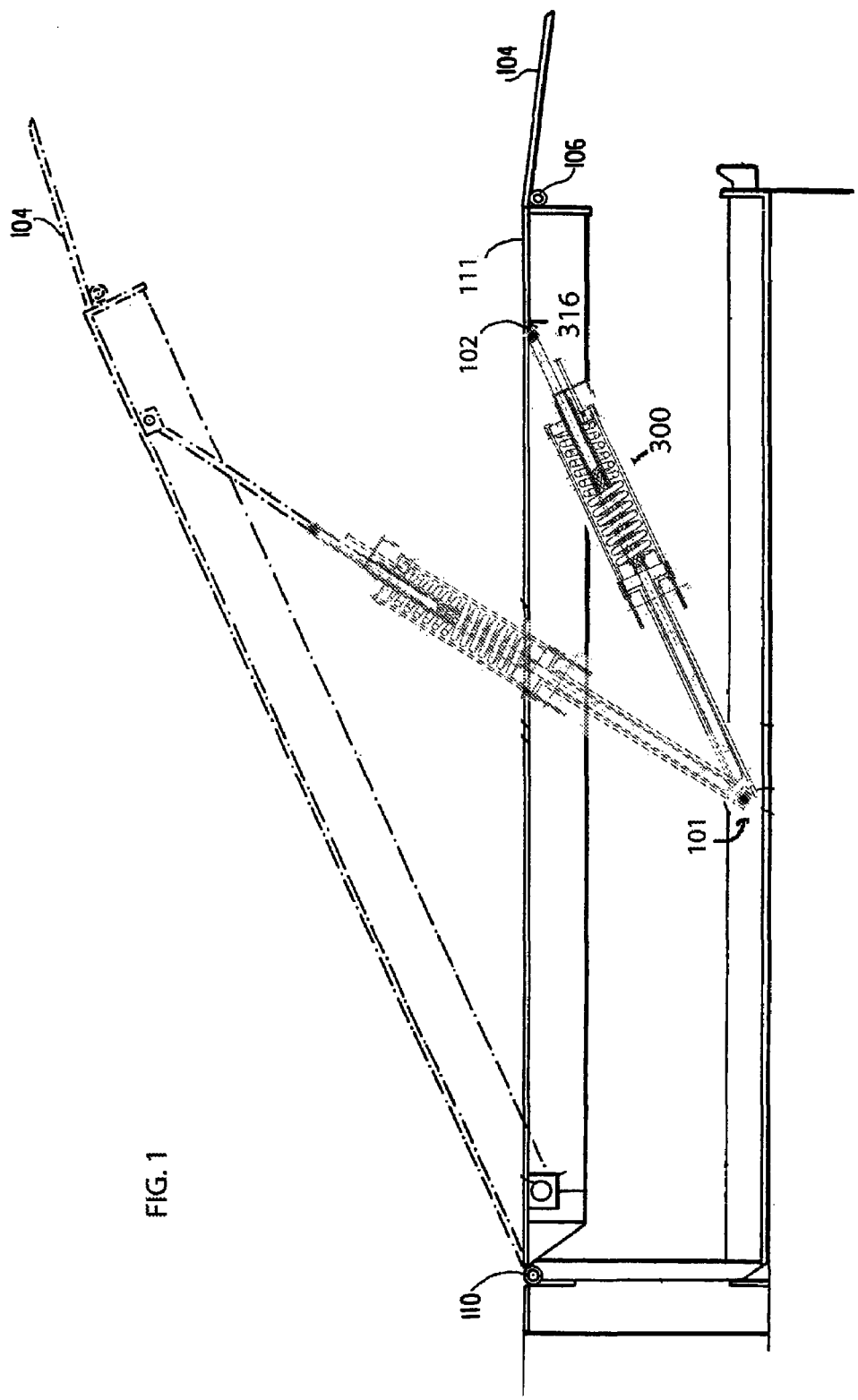
FIG. 1 is a side view of a mechanical dock leveler that utilizes a preferred embodiment of the improved holddown of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring to FIG. 1, there is illustrated a dock leveler of somewhat conventional construction except for its use of the improved holddown or holddown mechanism 300 of the present invention. This dock leveler consists of a planar ramp or deck 111 that is connected at its pivoting end by a hinge 110 which attaches to the dock leveler's support frame 101. The ramp 111 is adapted to pivot about this hinge 110 so that its free end can adjust to the varying heights of truck or vehicle load beds. This dock leveler also has a lip 104 that is pivotably attached at the ramp's free end by a hinge 106 that connects to the ramp's frame 102. This lip is adapted to move about its hinge during operation to extend the lip's distal end into the load bed of a truck that is parked in front of this dock leveler and the loading dock on which it is being used. When the dock leveler's ramp 111 is in its stored or horizontal position, this lip 104 rests in a vertical pendent position.

This dock leveler is the "mechanical" type in that it is assumed to feature an upwardly biased counterbalance system—usually involving heavy duty springs in some sort of configuration. The configuration of the counterbalance system is irrelevant to the present invention and therefore has not been shown in this application's drawings. However, it is important to know that a constant upward force exists on the ramp 111 due to this counterbalance system and that this force is sufficient to cause the free end of the ramp 111 to pivot upward if no additional downward force or weight were acting on the ramp and, consequently, it is necessary to provide a holddown 300 to hold the ramp in a desired position.

Figure 3:
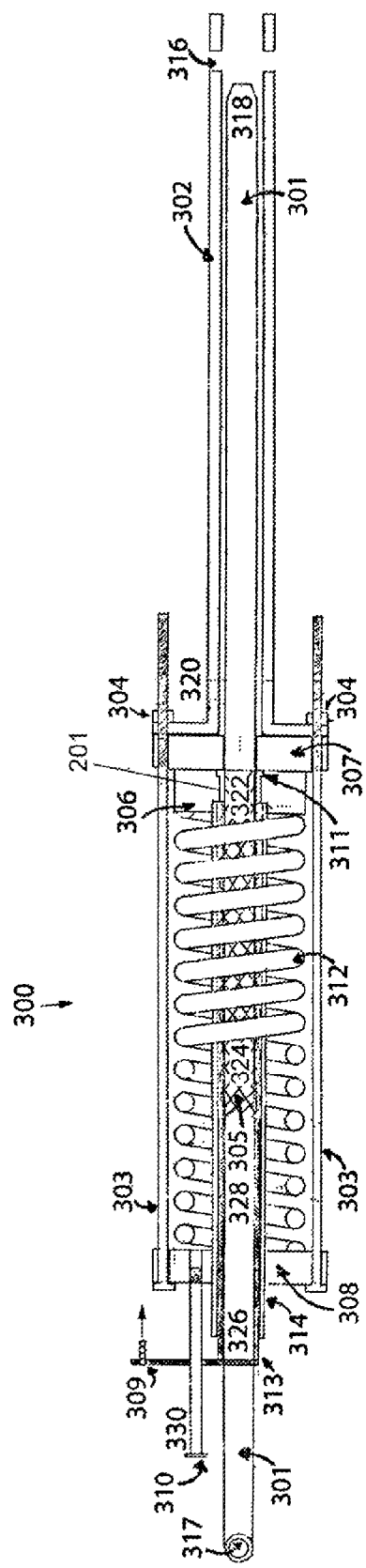
FIG. 3 is a side view of a preferred embodiment of the present invention.

FIG. 3 depicts a preferred embodiment of the present invention, an improved self releasing holddown 300 for a mechanical dock leveler. The holddown includes an elongated, substantially rigid member or bar 301 that is pivotally connected at one end 317 to the ramp's frame 102. This bar is of a generally circular cross-section and has a distal end 318, a nominal diameter and length, but can be of any tubular-like shape and may have a surface that is generally smooth, textured or notched. It has an outer surface that has a specified surface hardness.

The holddown also includes an attachment arm 302 which is operably connected at its pivoting end 316 to the dock leveler frame 101 at a pivot connection formed in part by an anchor means including a clevis. Attachment arm 302 has a distal end 320 and will often have over most of its length a tubular cross section that is generally square, but can be any sort of shape. The arm's purpose is to connect the dock leveler support frame 101 to the rest of the holddown.

Three disks 306, 307, 308 with holes in their centers for the rod 301 to pass through them are used as part of a means for, in part, attaching the distal or non-pivoting end 320 of attachment arm 302 to the attachment arm end 322 of a tubular, wire mesh grip or Kellems grip 305. Disks 307 and 308 are held in a position relative to each other by means of three or more identical connecting bolts 303 and nuts 304 or other suitable adjustable spacing members 303. These bolts are evenly spaced and pass through holes in the disks 307 and 308 and through holes in attachment arm 302. Disks 307 and 308 have a hole through their centers to allow for rod 301 to slide longitudinally. Disk 307 has a countersunk recessed area 311 so that the attachment arm end of the wire mesh grip 305 can be supported and attached to the attachment arm.

Figure 2:
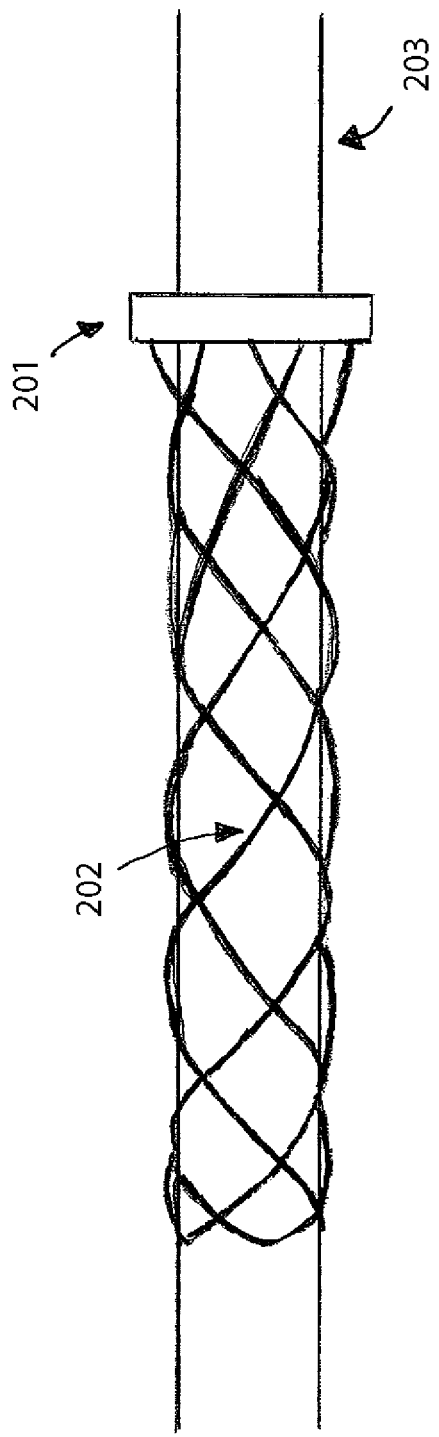
FIG. 2 is a side view of a preferred embodiment of a wire mesh grip that is suitable for use with the present invention.

The present invention's tubular, wire mesh grip or gripping/engagement sleeve or means 305 comprises an elongated braided, contractable and expandable gripping sleeve or tube 202, preferably made of high strength but flexible filamentary members. These filamentary members have outer surfaces that have a prescribed surface hardness. See FIG. 2. Such grips are well known in the art and are formed in such a way that the tube's inner diameter is flexible or adjustable in that it expands a specifiable amount when the grip is put under a prescribed compressive force and contracts similarly when it is put into tension. One end, the attachment arm end 322, of the gripping sleeve has a collar 201 that is used to attach to disk 307. Other methods of attachment are available but the collar type attachment is the preferred method. The other or release end 324 of the grip has an opening allowing the FIG. 2 illustrative rod 203 to be received within the gripping sleeve.

The filamentary members comprising the gripping sleeve are resiliently biased so that, when the gripping sleeve is in a stress free, unconstrained state, the inner diameter of the gripping sleeve is smaller than the outer diameter of the rod. Because the gripping sleeve is braided, compressing the gripping sleeve lengthwise will expand the sleeve's diameter radially outwardly, while tensioning the gripping sleeve will cause its diameter to contract radially inwardly. This characteristic is known as the "trellis effect" and is exhibited by braided structures. Taking advantage of the trellis effect, the gripping sleeve is compressed lengthwise, expanding its inner diameter (i.e., to a first specified diameter) against the resilient biasing forces, to a size that allows the rod to slide or move within the gripping sleeve. When the compressive force is removed, the resilient biasing of the braid causes the sleeve to contract inwardly (i.e., to a second specified diameter) and grip the rod. If a tensile force is exerted between the rod 203 and the collar 201, the braiding will constrict and further grip the rod, preventing its movement. The more tensile force exerted, the greater the constrictive grip becomes due to the trellis effect.

The wire mesh grip 305 is supported by the collar 201 which fits within the recessed area 311 in disk 307. Due to the aforementioned trellis effect, this wire mesh grip 305 forms the attachment or engagement points between the bar 301 and the attachment arm 302. If a tensile force from the spring counterbalance system of the mechanical dock leveler is exerted between points 317 and 316, the bar 301 will not be able to slip due to the grip 305 engaging the bar and exerting a constrictive force on it, as explained by the trellis effect. The grip 305 is disengaged by exerting a lengthwise compressive force on the release end of the grip. This force causes the braided grip to expand radially outwardly and in so doing relieves the constrictive grip on the bar 301 thereby allowing the bar's free end to move relative to the pivoting end 316 of the attachment arm.

While a Kellems grip is the preferred gripping or engagement, it is not the only possible means. Other gripping means include twisting a filamentary member around the bar. As such a filament member is twisted, it constricts around the bar providing an inward gripping force.

For the efficient operation of the present invention, it is essential that it be provided with a disengagement means that is configured to be attached to the invention's attachment arm and apply a compressive force to the release end of the gripping means to cause it to release the holddown when it is desired that the ramp's free end be raised.

The necessary disengagement force for this operation is provided by a disengagement means that includes a release tube 313 that is attached at its release end 326 to a release arm 309 that is set apart from the attachment arm's distal end 320 by an adjustable spacing member that includes the discs 307, 308, bolts 303 and nuts 304 shown in FIG. 3. The grip end 328 of this release tube connects to the wire grip's release end 324. A release tube cover 314 is used to help assure the reliability of this connection. A lanyard is attached to the release arm and when the lanyard is pulled in a direction parallel to the bar and towards the attachment arm's pivoting end 316, the release tube 313 exerts a compressive force on the release end 324 of the grip 305, releasing the grip and allowing the bar 301 to move relative to the attachment arm 302, thus allowing the dock leveler ramp's free end to raise.

Operation of the present invention thus involves a dock worker pulling on the lanyard to release the wire grip's hold on the bar to allow the ramp's free end to raise. The worker then walks onto the ramp and the added weight of the worker forces the ramp down to the level of the truck load bed or down to the ramp's stored position. As the ramp lowers, the bar 301 slides into the attachment arm through the release tube 313, through the disk 308, through the release grip cover 314, through the center space of the grip 305, through the collar 201 at the end of the grip and through disks 306 and 307. When the dock worker walks off of the ramp, the wire grip 305 engages the bar 301 and prevents the dock leveler ramp from rising again.

It is desirable for a holddown to have a certain amount of "give" or "float". Truck load beds often rise and fall during the normal course of loading/unloading. As a load bed rises, an upward force is exerted on the ramp's lip 104 which is transferred to the ramp 111 and subsequently to the holddown 300. The holddown needs to have a self-releasing capability so that the holddown's disengagement means will release the engagement of its gripping means to the elongated member when the tensile forces resulting from a rising load bed and ramp achieve a specified strength that if not released would shortly thereafter damage or tear apart the holddown.

This problem is solved by a self-releasing or biasing means that is incorporated into the holddown's attachment arm. This biasing means includes a float spring 312 which compresses as the ends 316, 317 of the holddown are pulled apart. The spring 312 is compressed between disks 306 and 308. As a tensile force is exerted on the holddown, the bar 301 pulls on grip 305 in a direction away from the attachment arm's pivoting end 316. Disk 306 is pulled towards disk 308 which causes the spring 312 to compress. A stop bolt or member 310 is attached to disk 308 and runs through a hole in the release arm 309. This bolt 310 acts as an adjustable float stop. As the spring 312 compresses, the bar 301 and the release tube 313 and arm 309 move towards the bar's pivoting end point 317 and the head or free end 330 of the bolt 310. As the bar 301 extends, the release arm 309 approaches the bolt's head until they engage. Once they engage, any further extension of the bar 301 causes the release arm to be held stationary by the float stop, thus exerting a compressive force on grip 305. This compressive force opens the grip due to the trellis effect, thus releasing bar 301 and creating a limit to the amount of spring compression or "float". Bar 301 is immediately reengaged by the grip when the release arm 309 is no longer engaged by the bolt head which is a result of bar 301 extending relative to the grip. The bolt 310 is threaded into disk 308 and is therefore capable of adjusting the amount of float based on the distance between the bolt head and release arm 309. To prevent the spring 312 from being compressed by the spring counterbalance of the mechanical dock leveler while at rest, this spring 312 must be pre-loaded. This is done by tightening down on the nuts 304 of the bolts 303.

Figure 4:
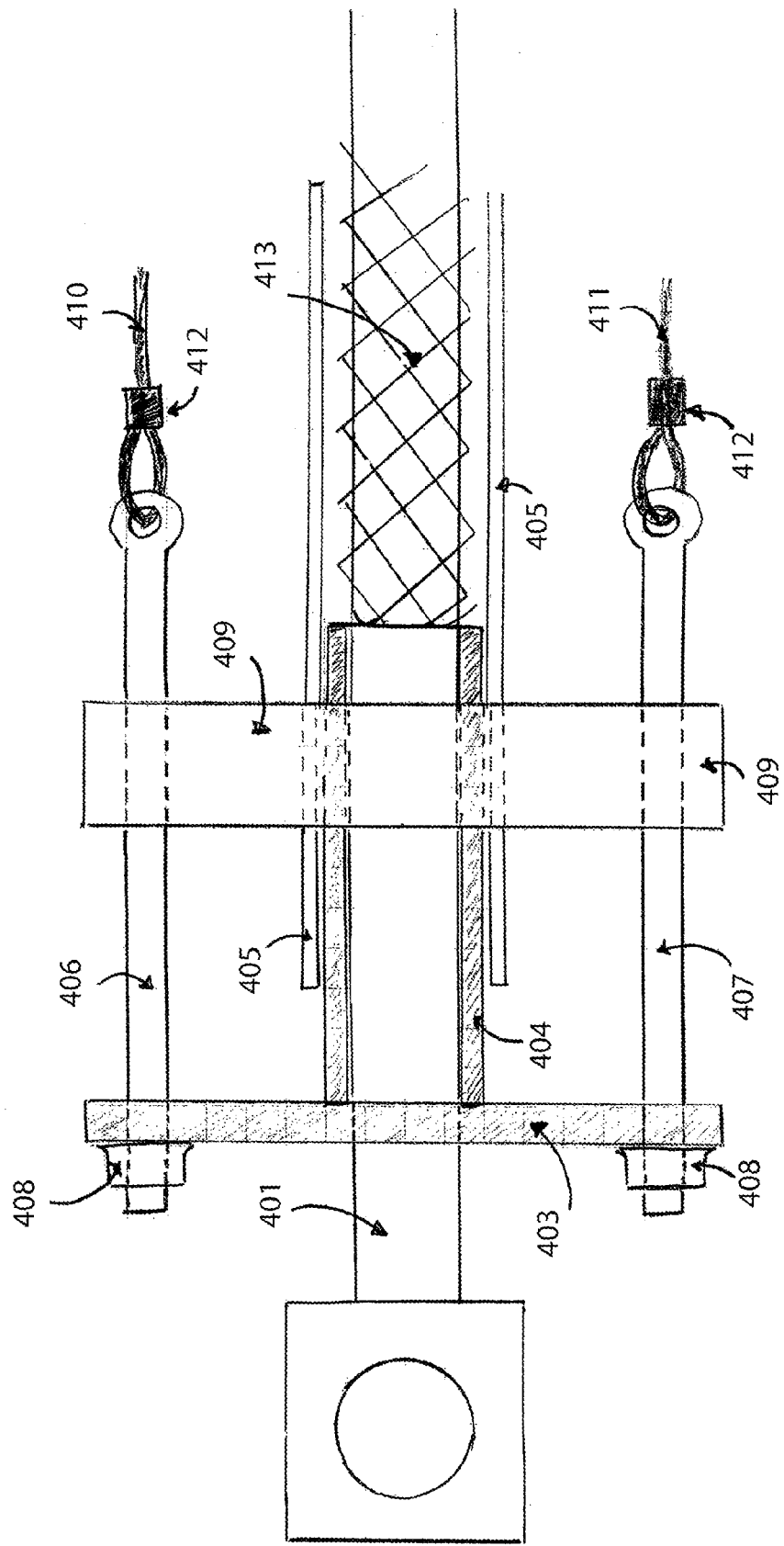
FIG. 4 is a side view of a preferred embodiment of the present invention's release mechanism.

FIG. 4 shows another version of the present invention's disengagement and self-releasing means. It is desirable to pull on the release arm 403 in an even manner such that no moment is created about the center line of the holddown, and thus an even force is applied on the release tube 404. This is achieved by utilizing bolts 406 and 407 that pass through holes in disk 409 and through holes in the release arm 403. Locking nuts 408 hold the bolts in place. The ends of the bolts 406, 407 are attached to lanyards 410, 411 which are spliced or joined together such that when a dock worker pulls the release chain connected to the lanyards, both lanyards are pulled evenly. In this case, bolts 406 and 407 are eyebolts so that the lanyards 410, 411 can be looped through and crimped with ferrules 412. In use, a dock worker pulls a chain connected to lanyards 410, 411. This pulls on the eyebolts 406, 407 which are connected to the release arm 403 by nuts 408. The release arm 403 subsequently pushes on the release tube 404 which compresses grip 413 while being guiding by the release tube's cover 405 to allow the bar 401 to be released. The amount of float is set by the distance between the "eyes" of the eyebolts 406, 407 and disk 409. To decrease the amount of float, decrease the distance between the eyes and disk by tightening nuts 408.

The advantages of the present invention include, a holddown mechanism that is cheaper to manufacture due to its simple configuration and lack of major machining of parts. Nearly all the parts in the present invention are basic shapes made from materials that are easily accessible and mass produced. Additionally, the present invention includes fewer parts than existing holddowns which provides a cost advantage. It also requires less labor to assemble due to the fact that only a few nuts and bolts are used to hold the present invention together. Meanwhile, the Kellems grip of the present invention has the advantage of being able to adjust to changes in the bar cross section shape as the bar 302 wears down over time (i.e., it can accommodate these bar diameter reductions so as to yield no disruptions in the operation of the holddown mechanism). This will happen as it has been found through testing that the gripping or engagement means of the present invention works best when the bar is constructed of a softer material than the Kellems grip (i.e., the elongated member's outer surface has a specified surface hardness that is less than the prescribed surface hardness of the outer surfaces of the wire mesh's filamentary members). As a result, the bar will experience more wear than the grip.

The foregoing is considered as illustrative only of the principles of the invention. For example, the present invention could just as well been described above as a method for preventing the upward movement of the upwardly biased ramp of a mechanical dock leveler, and where the steps in such a method include utilizing a holddown mechanism that includes an elongated member, an attachment arm and a tubular gripping means, and wherein these parts are configured as described above.

Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A holddown mechanism for a loading dock comprising a frame, a platform pivotally mounted in said frame, and a dock leveler for biasing said platform to pivot within said frame, said holddown mechanism maintaining said platform in a desired position against the bias of said dock leveler, said holddown mechanism being pivotally attached to both said frame and to said platform and further comprising: an elongated member having a pivoting end pivotally attached to said platform and a distal end; an attachment arm having a pivoting end pivotally attached to said frame and a distal end, the pivoting end of said elongated member being telescopically extendable from the distal end of said attachment arm; a tubular wire mesh grip encircling said elongated member and coupled to the distal end of said attachment arm, said tubular wire mesh grip having an adjustable diameter and configured to expand and contract around said elongated member; said elongated member being slidable through said tubular wire mesh grip when said tubular wire mesh grip is expanded, and said elongated member being fixedly gripped within said tubular wire mesh grip when said tubular wire mesh grip is contracted; and a disengagement mechanism comprising a tubular member encircling said elongated member and a lanyard operatively engaged with said tubular member for remotely urging said tubular member into said tubular wire mesh grip to expand said tubular wire mesh grip and thereby release said elongated member for telescopic extension.

2. The holddown mechanism as recited in claim 1, wherein said disengagement mechanism further comprises an attachment arm connecting said lanyard to said tubular member to apply a compressive force to said tubular wire mesh grip so as to cause the disengagement of said tubular wire mesh grip from said elongated member.

3. The holddown mechanism as recited in claim 2, further comprising: a self-releasing mechanism for allowing a predetermined amount of telescopic extension of said elongated member from said attachment arm and to cause said disengagement mechanism to release the engagement of said tubular wire mesh grip with said elongated member when a predetermined amount of translation of said elongated member relative to said attachment arm is exceeded.

4. The holddown mechanism as recited in claim 2, wherein: said disengagement mechanism includes an adjustable spacing member configured so as to locate said tubular member in an adjustable, spaced apart relationship from said attachment arm.

5. The holddown mechanism as recited in claim 3, wherein: wherein: said disengagement mechanism includes an adjustable spacing member configured so as to locate said tubular member in an adjustable, spaced apart relationship from said attachment arm.

6. A holddown mechanism, comprising: an elongated member having a pivoting end and a distal end; an attachment arm having a pivoting end and a distal end, the pivoting end of said elongated member being telescopically extendable from the distal end of said attachment arm; a tubular wire mesh grip encircling said elongated member and coupled to the distal end of said attachment arm, said tubular wire mesh grip having an adjustable diameter and configured to expand and contract around said elongated member; said elongated member being slidable through said tubular wire mesh grip when said tubular wire mesh grip is expanded, and said elongated member being fixedly gripped within said tubular wire mesh grip when said tubular wire mesh grip is contracted; a disengagement mechanism including a release tube for selectively expanding said tubular wire mesh grip and thereby releasing said elongated member for telescopic extension; and a self-releasing mechanism including a stop member having a free end, said stop member being configured so that said free end of said stop member is set at a prescribed distance from said release tube so that said free end of said stop member acts at the prescribed distance to expand said tubular wire mesh grip, releasing said elongated member when an undue tensile force is imposed on said holddown mechanism.

7. The holddown mechanism as recited in claim 3, wherein: said self-releasing mechanism includes a stop member having a free end, said stop member being configured so that said free end of said stop member is set at a prescribed distance from said release tube so that said free end of said stop member acts at the prescribed distance to expand said tubular wire mesh grip and thereby release said elongated member.

8. A method for preventing an upward movement of an upwardly biased ramp by a mechanical dock leveler, said method comprising the steps of: pivotally attaching a holddown mechanism between said ramp and a fixed support, said holddown mechanism including an elongated member, an attachment arm, wherein said elongated member is telescopically extendable from said attachment arm, and a tubular wire mesh grip encircling said elongated member and coupled to the attachment arm, said tubular wire mesh grip having an adjustable diameter configured to expand and contract around said elongated member; preventing upward movement of said ramp by said mechanical dock leveler by contracting the tubular wire mesh grip and thereby gripping said elongated member; and allowing upward movement of said ramp by said mechanical dock leveler by expanding said tubular wire mesh grip to disengage said tubular wire mesh grip from said elongated member, thereby releasing said elongated member for telescopic extension.

9. The method as recited in claim 8, wherein: said holddown mechanism further includes a disengagement mechanism, and said step of allowing upward movement of said ramp further comprises applying a compressive force to said tubular wire mesh grip so as to cause the disengagement of said tubular wire mesh grip from said elongated member.

10. The method as recited in claim 8, wherein: said holddown mechanism further includes a self-releasing mechanism, and said step of allowing upward movement of said ramp further comprises disengaging said tubular wire mesh grip from said elongated member by said self-releasing mechanism when an imposed tensile force on said holddown mechanism achieves a specified strength.

11. The method as recited in claim 9, wherein: said step of allowing upward movement of said ramp further comprises disengaging said tubular wire mesh grip from said elongated member by a self-releasing mechanism when an imposed tensile force on said holddown mechanism achieves a specified strength.

12. The method as recited in claim 9, wherein: said disengagement mechanism comprises a release tube and an adjustable spacing member, with said release tube having a release end and a grip end, said spacing member configured so as to locate said grip end of said release tube in an adjustable, spaced apart relationship from said distal end of said attachment arm, and said grip end of said release tube configured to connect to a release end of said tubular wire mesh grip and be adjustably movable with respect to a distal end of said attachment arm so as to apply said compressive force to said release end of said tubular wire mesh grip to cause the disengagement of said tubular sire mesh grip from said elongated member.

13. The method as recited in claim 10, wherein:
said holddown mechanism further includes a disengagement mechanism comprising a release tube and an adjustable spacing member, with said release tube having a release end and a grip end, said spacing member configured so as to locate said grip end of said release tube in an adjustable, spaced apart relationship from said distal end of said attachment arm, and said grip end of said release tube configured to connect to a release end of said tubular wire mesh grip and be adjustably movable with respect to a distal end of said attachment arm so as to apply a compressive force to said release end of said tubular wire mesh grip to cause the disengagement of said tabular wire mesh grip from said elongated member.

14. The method as recited in claim 10, wherein: said self-releasing mechanism includes a stop member having a free end, and said stop member configured so that said free end of said stop member is set at a prescribed distance from a release end of said a release tube so that said free end of said stop member acts at the occurrence of said imposed tensile force on said holddown mechanism to impose a compressive force on said tubular wire mesh grip to cause said adjustable diameter of said tubular wire mesh grip to expand and disengage said tubular wire mesh grip from said elongated member.

15. The method as recited in claim 11, wherein: said self-releasing mechanism includes a stop member having a free end, and said stop member configured so that said free end of said stop member is set at a prescribed distance from a release end of said a release tube so that said free end of said stop member acts at the occurrence of said imposed tensile force on said holddown mechanism to impose a compressive force on said tubular wire mesh grip to cause said adjustable diameter of said tubular wire mesh grip to expand and disengage said tubular wire mesh grip from said elongated member.

16. The method as recited in claim 12, wherein: said step of allowing upward movement of said ramp further comprises disengaging said tubular wire mesh grip from said elongated member by a self-releasing mechanism, said self-releasing mechanism includes a stop member having a free end, and said stop member configured so that said free end of said stop member is set at a prescribed distance from said release end of said release tube so that said free end of said stop member acts at the occurrence of an imposed tensile force on said holddown mechanism to impose a compressive force on said tubular wire mesh grip to cause said tubular wire mesh grip to expand and disengage said tubular wire mesh grip from said elongated member.

17. The holddown mechanism as recited in claim 1, wherein:
said tubular wire mesh grip includes a plurality of filamentary members, each of said filamentary members having an outer surface with a prescribed surface hardness, and said elongated member having an outer surface with a specified surface hardness that is less than said prescribed surface hardness of said outer surfaces of said filamentary members.

18. The holddown mechanism as recited in claim 3, wherein:
said tubular wire mesh grip includes a plurality of filamentary members, each of said filamentary members having an outer surface with a prescribed surface hardness, and said elongated member having an outer surface with a specified surface hardness that is less than said prescribed surface hardness of said outer surfaces of said filamentary members.

19. The holddown mechanism as recited in claim 17, wherein:
said specified surface hardness of said outer surface of said elongated member is further set such that a nominal diameter of said elongated member decreases in magnitude over time as said holddown mechanism is repeatedly operated over time to prevent an upward movement of said platform by said dock leveler, and said tubular wire mesh grip is further configured so as to accommodate said decreasing nominal diameter of said elongated member so as to not disrupt said operation over time of said holddown mechanism.

20. The holddown mechanism as recited in claim 18, wherein:
said specified surface hardness of said outer surface of said elongated member is further set such that a nominal diameter of said elongated member decreases in magnitude over time as said holddown mechanism is repeatedly operated over time to prevent an upward movement of said platform by said dock leveler, and said tubular wire mesh grip is further configured so as to accomodate said decreasing nominal diameter of said elongated member so as to not disrupt said operation over time of said holddown mechanism.

* * * * *